(12) United States Patent
Mou et al.

(10) Patent No.: US 11,383,825 B2
(45) Date of Patent: Jul. 12, 2022

(54) MICRO DETECTING DEVICE

(71) Applicant: Microjet Technology Co., Ltd., Hsinchu (TW)

(72) Inventors: Hao-Jan Mou, Hsinchu (TW); Chi-Feng Huang, Hsinchu (TW); Yung-Lung Han, Hsinchu (TW); Chang-Yen Tsai, Hsinchu (TW); Wei-Ming Lee, Hsinchu (TW); Hsuan-Kai Chen, Hsinchu (TW); Chun-Yi Kuo, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 336 days.

(21) Appl. No.: 16/791,844

(22) Filed: Feb. 14, 2020

(65) Prior Publication Data
US 2020/0262545 A1 Aug. 20, 2020

(30) Foreign Application Priority Data
Feb. 20, 2019 (TW) .................................. 108105680

(51) Int. Cl.
*B64C 19/02* (2006.01)
*B64C 39/02* (2006.01)
(Continued)

(52) U.S. Cl.
CPC .............. *B64C 19/02* (2013.01); *B60L 50/60* (2019.02); *B64C 39/028* (2013.01); *B64D 27/24* (2013.01);
(Continued)

(58) Field of Classification Search
CPC ....... B64C 19/02; B64C 39/024; B64C 39/02; B64C 2201/146; B64C 2201/027;
(Continued)

(56) References Cited

U.S. PATENT DOCUMENTS

| 7,090,471 B2 | 8/2006 | Xie et al. |
| 7,445,017 B2 | 11/2008 | Cabuz et al. |
| 10,669,042 B2 * | 6/2020 | Molnar ................. F21V 29/677 |

FOREIGN PATENT DOCUMENTS

| CN | 105805411 A | 7/2016 |
| CN | 105805412 A | 7/2016 |

(Continued)

*Primary Examiner* — Valentina Xavier
(74) *Attorney, Agent, or Firm* — Birch, Stewart, Kolasch & Birch, LLP

(57) ABSTRACT

A micro detecting device includes a flying main body, at least one fluid actuation system, an image capture system and a controller. The fluid actuation system is disposed within the flying main body and includes a driving module, a flow guiding channel, a convergence chamber, plural valves and a fluid discharging zone. The driving module is consisting of plural flow guiding units for transporting fluid. The flow guiding channel includes plural diverge channels which are in fluid communication with plural connection channels. The convergence chamber is in fluid communication between the corresponding diverge channels. The valves are respectively disposed in the corresponding connection channels and controlled in open/closed state for the corresponding connection channels. The fluid discharging zone is in communication with the connection channels. The image capture system is used to capture external image. The controller is connected to the valves to control the valves in the open/closed state.

20 Claims, 16 Drawing Sheets

(51) Int. Cl.
*B64D 47/08* (2006.01)
*B64D 27/24* (2006.01)
*B60L 50/60* (2019.01)
*H01M 4/583* (2010.01)

(52) U.S. Cl.
CPC ............ *B64D 47/08* (2013.01); *H01M 4/583* (2013.01); *B60L 2200/10* (2013.01); *B64C 2201/027* (2013.01); *B64C 2201/042* (2013.01); *B64C 2201/127* (2013.01); *B64D 2211/00* (2013.01)

(58) Field of Classification Search
CPC ......... B64C 2201/042; B64C 2201/127; B60L 50/60; B60L 2200/10; B64D 27/16; B64D 27/24; B64D 47/08; B64D 2211/00; H01M 4/583; F02K 7/08; Y02T 10/70; Y02T 50/50; Y02T 90/16; Y02E 60/10
See application file for complete search history.

(56) References Cited

FOREIGN PATENT DOCUMENTS

| | | | | |
|---|---|---|---|---|
| CN | 111990388 A | * | 11/2020 | ........... A01C 23/005 |
| GB | 2569002 A | * | 6/2019 | ............... B64B 1/38 |
| KR | 10-2009-0126791 A | | 12/2009 | |
| TW | M542077 U | | 5/2017 | |

\* cited by examiner

MICRO DETECTING DEVICE

FIELD OF THE INVENTION

The present disclosure relates to a detecting device, and more particularly to a micro detecting device capable of remotely controlled flying.

BACKGROUND OF THE INVENTION

Nowadays, in various fields such as pharmaceutical industries, computer techniques, printing industries or energy industries, the products are developed toward elaboration and miniaturization. The fluid transportation devices are important components that are used in, for example micro pumps, micro atomizers, print heads or industrial printers.

In various industries, such as pharmaceutical, electronics, printing, energy, or even traditional industries, there are many instruments or equipment that require pneumatic power to drive them. Usually, conventional motors and pneumatic valves are used to achieve the purpose of gas transportation. Owing to the volume limitation of these traditional motors and pneumatic valves, it is difficult to reduce the entire size of such instruments and equipment. Namely, it is difficult to achieve the purpose of thinning said instruments and equipment, not to mention the purpose of portability. Besides, in order to achieve the required kinetic energy, these conventional driving devices usually need to have a huge volume to accommodate all kinds of complicated driving cores. Moreover, when the conventional driving devices are operated, huge noise or flying dust and other pollution are generated. Consequently, a lot of inconvenience and discomfort are caused in use.

Therefore, there is a need of providing a micro detecting device having innovating structure to address the above drawbacks encountered by prior art.

SUMMARY OF THE INVENTION

An object of the present invention is to provide a micro detecting device capable of remotely controlled flying. A fluid actuation system is utilized to meet the needs of controlling various transporting amount and achieve the gas transportation in high transporting amount, high efficiency and high flexibility. Consequently, a sufficient driving force is provided for aerial mobility (i.e., capability of flight), and the efficacy of miniaturization, portable, low noise and convenience are achieved.

In accordance with an aspect of the present disclosure, a micro detecting device is provided and includes a flying main body, at least one fluid actuation system, an image capture system and a controller. The fluid actuation system is disposed within the flying main body and includes a driving module, a flow guiding channel, a convergence chamber, a plurality of valves and a fluid discharging zone. The driving module consists of a plurality of flow guiding units. Each flow guiding unit is actuated to transport fluid. The flow guiding channel includes a plurality of diverge channels. Each of the diverge channels is in fluid communication with a plurality of connection channels to flow a required amount of the fluid. The convergence chamber is in fluid communication between the two corresponding diverge channels to allow the fluid to be accumulated therein. Each of the valves is disposed in the corresponding connection channel and is controlled in an open/closed state for the corresponding connection channel. The fluid discharging zone is in fluid communication with the plurality of connection channels to converge and output the fluid with the required amount. The image capture system is used to capture an external image of the micro detecting device. The controller is connected to the plurality of valves to control the plurality of valves in the open/closed state so as to provide the flying main body with a driving force for aerial mobility, control the flight condition of the flying main body and control the operation of the image capture system.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
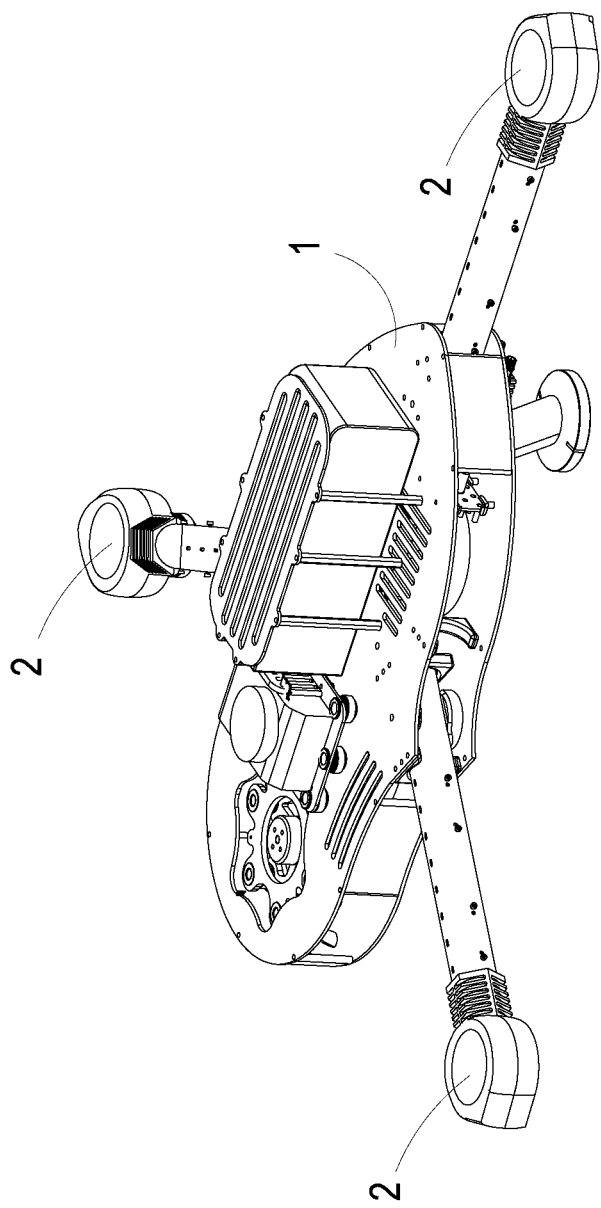
FIG. 1 schematically illustrates a micro detecting device according to an embodiment of the present disclosure.
Figure 2:
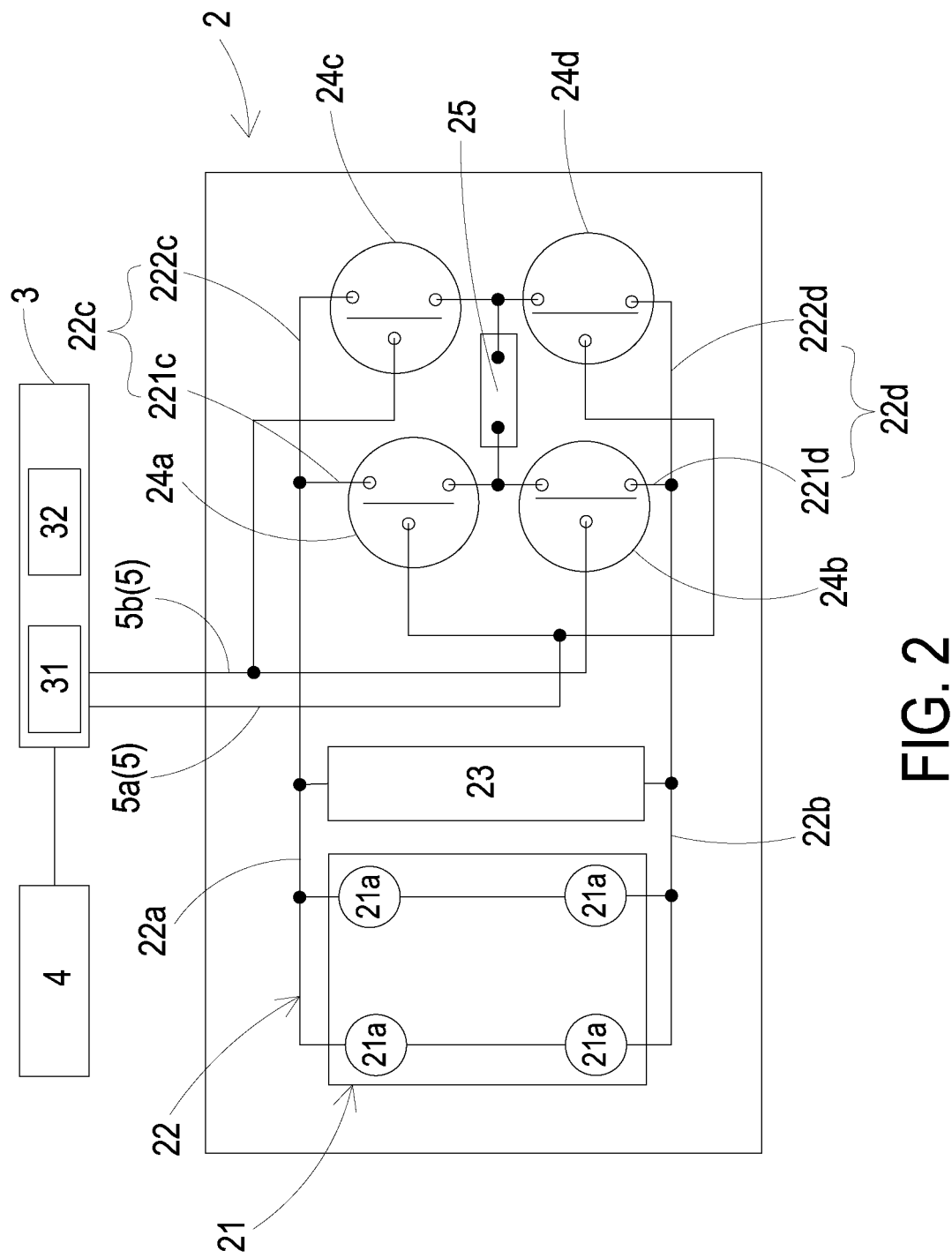
FIG. 2 is a block diagram illustrating a fluid actuation system and a controller of the micro detecting device according to the embodiment of the present disclosure.

Please refer to FIGS. 1 and 2. The present disclosure provides a micro detecting device 10 with capability of flight and of being remotely controlled. The micro detecting device 10 converts electric energy into kinetic energy, utilizes the kinetic energy to generate a specific fluid pressure and a specific fluid flow rate for flying, and implements the detection task through an image capture system carried thereon. In this embodment, the micro detecting device 10 includes a flying main body 1, at least one fluid actuation system 2, a controller 3, an image capture system 4 and a conductive wire unit 5. In this embodiment, the number of the fluid actuation system 2 is three, but not limited thereto. The number of the actuation system 2 can be adjusted according to design requirements. It should be noted that each pair of the fluid actuation system 2 has the same structure. In order to avoid redundant descriptions, the structure of one single fluid actuation system 2 is exemplified for descriptions in the following embodiments.

Figure 3A:
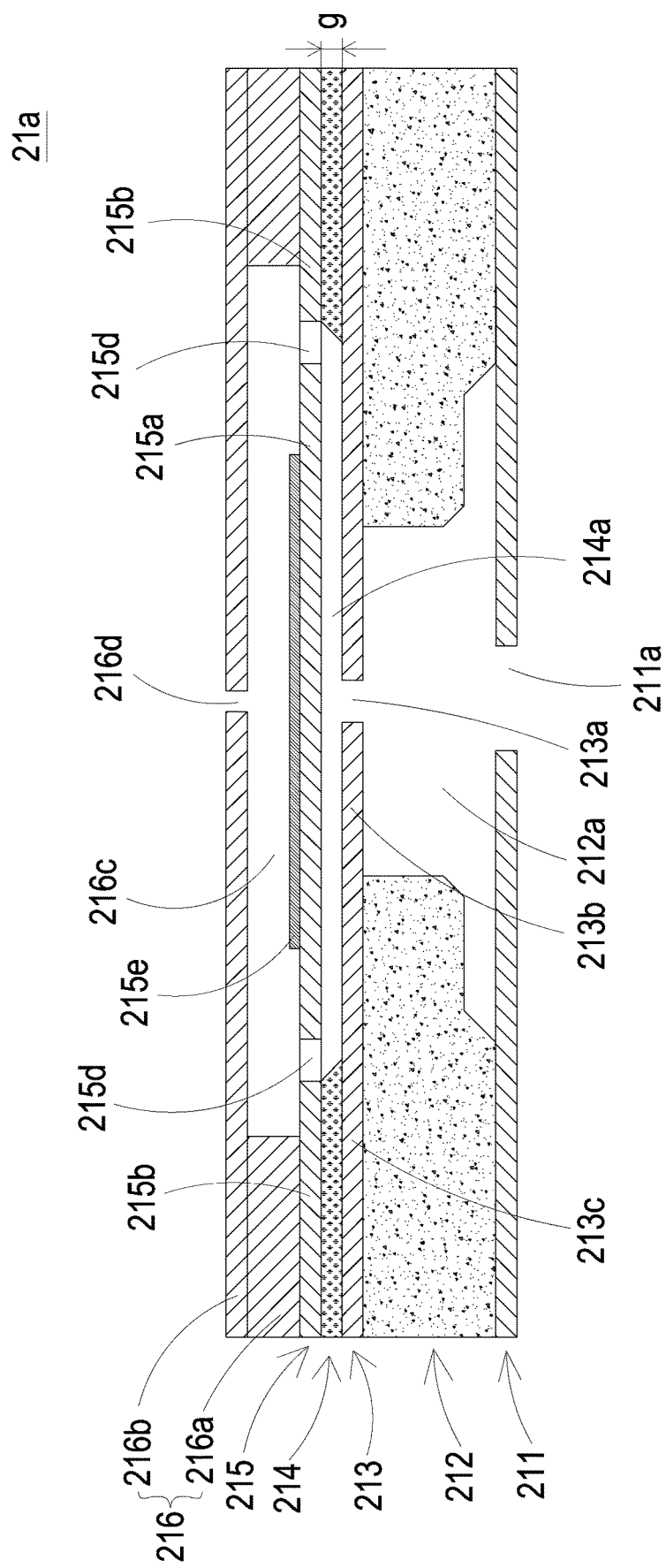
FIG. 3A is a schematic cross-sectional view illustrating a flow guiding unit of the fluid actuation system according to the embodiment of the present disclosure.

Please refer to FIGS. 2 and 3A. In this embodiment, the fluid actuation system 2 is disposed within the flying main body 1 and includes a driving module 21, a flow guiding channel 22, a convergence chamber 23, a plurality of valves 24a, 24b, 24c, 24d and a fluid discharging zone 25. In this embodiment, the driving module 21 consists of a plurality of flow guiding units 21a, and each of the flow guiding units 21a is a piezoelectric pump. In this embodiment, each flow guiding unit 21a includes an inlet plate 211, a base 212, a resonance plate 213, a spacer 214, an actuator 215 and an outlet plate 216, which are stacked on each other sequentially.

Please refer to FIG. 3A. In this embodiment, the inlet plate 211 has at least one inlet aperture 211a. The base 212 is stacked on and connected with the inlet plate 211 and has a communication channel 212a in fluid communication with the inlet aperture 211a of the inlet plate 211. The resonance plate 213 is stacked on and connected with the base 212 and includes a central aperture 213a, a movable part 213b and a fixing part 213c. Preferably but not exclusively, the central aperture 213a is formed in a center part of the resonance plate 213, spatially corresponds to the communication channel 212a of the base 212 and is in fluid communication with the communication channel 212a of the base 212. The movable part 213b is a flexible structure formed around the central aperture 213a and located at a part of the base 212, which is not contacted with the moveable part 213b. The fixing part 213c is fixed on a part of the base 212, which is contacted with the fixing part 213c. The spacer 214 is stacked on the fixing part 213c of the resonance plate 213, and the center part of the spacer 214 is hollowed to form a buffering chamber 214a. The actuator 215 is stacked on the spacer 214. In that, the spacer 214 is disposed between the resonance plate 213 and the actuator 215, and the depth of the buffering chamber 214a is defined by the thickness g of the spacer 214. More specifically, the spacer 214 has a hollow portion in the center. After stacking the resonance plate 213, the spacer 214 and the actuator 215, the space in such hollow portion is enclosed to form the buffering chamber 214a. The thickness g of the spacer 214 corresponds to the depth of the buffering chamber 214a. The thicker the spacer 214 is, the deeper the buffering chamber 214a is. The depth of the buffering chamber 214a is determined by the thickness g of the spacer 214.

Figure 3B:
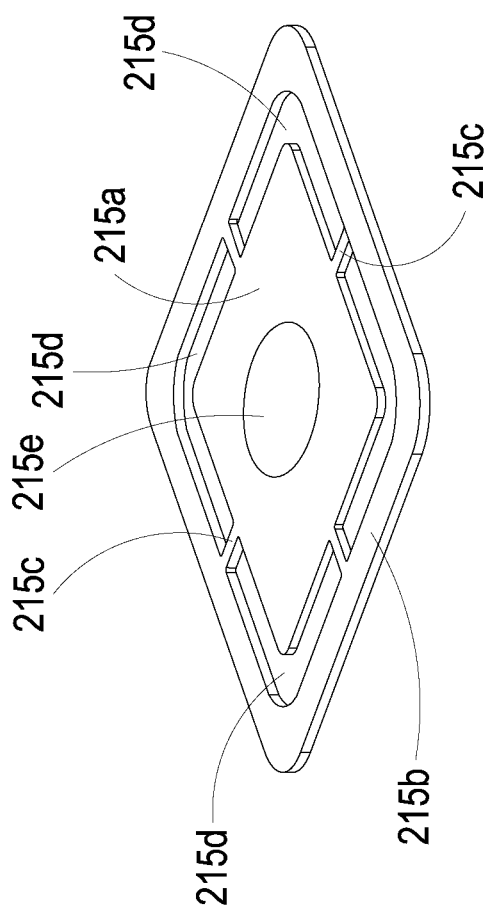
FIG. 3B is a perspective structural view illustrating an actuator of the flow guiding unit according to the embodiment of the present disclosure.

Please refer to FIG. 3B. In this embodiment, the actuator 215 is a suspension structure with gaps therein. The actuator 215 includes a suspension part 215a, an outer frame part 215b, a plurality of connecting parts 215c, a plurality of vacant spaces 215d and a piezoelectric element 215e. The suspension part 215a is connected with the outer frame part 215b through the connecting parts 215c, so that the suspension part 215a is suspended and elastically supported by the connecting parts 215c, and is movable. The vacant spaces 215d are defined between the suspension part 215a and the outer frame part 215b for allowing the fluid to flow therethrough. The piezoelectric element 215e is attached on a surface of the suspension part 215a. The way of disposition, the types and the numbers of the suspension part 215a, the outer frame part 215b and the vacant spaces 215d may be varied according to the design requirements, but not limited thereto.

Please refer to FIGS. 3A and 3B. In this embodiment, the outlet plate 216 is formed by stacking a chamber plate 216a with a cover plate 216b. The chamber plate 216a is stacked on the actuator 215 and thus forms an outlet chamber 216c located at its center. The cover plate 216b is covered on a partial region of the suspension part 215a, the outer frame part 215b, the connecting parts 215c, the vacant spaces 215d and the piezoelectric element 215e, and has an outlet aperture 216d in fluid communication with the outlet chamber 216c.

In this embodiment, the base 212 of the flow guiding unit 21a further includes a driving circuit (not shown) electrically connected to the positive electrode (not shown) and the negative electrode (not shown) of the piezoelectric element 215e so as to provide driving power to the piezoelectric element 215e, but not limited thereto. In other embodiments, the driving circuit may be disposed at any position within the flow guiding unit 21a. The disposed position of the driving circuit may be varied according to design requirements.

In this embodiment, the flow guiding unit 21a is manufactured through a conventional machining process, MEMS process or semiconductor process, but not limited thereto. The flow guiding unit 21a may be manufactured through different processes according to design requirements.

In this embodiment, the flow guiding unit 21a is made of a material with millimeter structure, and the size of the flow guiding unit 21a is in the range between 1 millimeter and 999 millimeter. In other embodiment, the flow guiding unit 21a is made of a material with micron structure, and the size of the flow guiding unit 21a is in the range between 1 micron and 999 micron. In another embodiment, the flow guiding unit 21a is made of a material with nanometer structure, and the size of the flow guiding unit 21a is in the range between 1 nanometer and 999 nanometer. The size of the flow guiding unit 21a would not be limited to the range described above and may be varied according to product requirements.

Figure 3C:
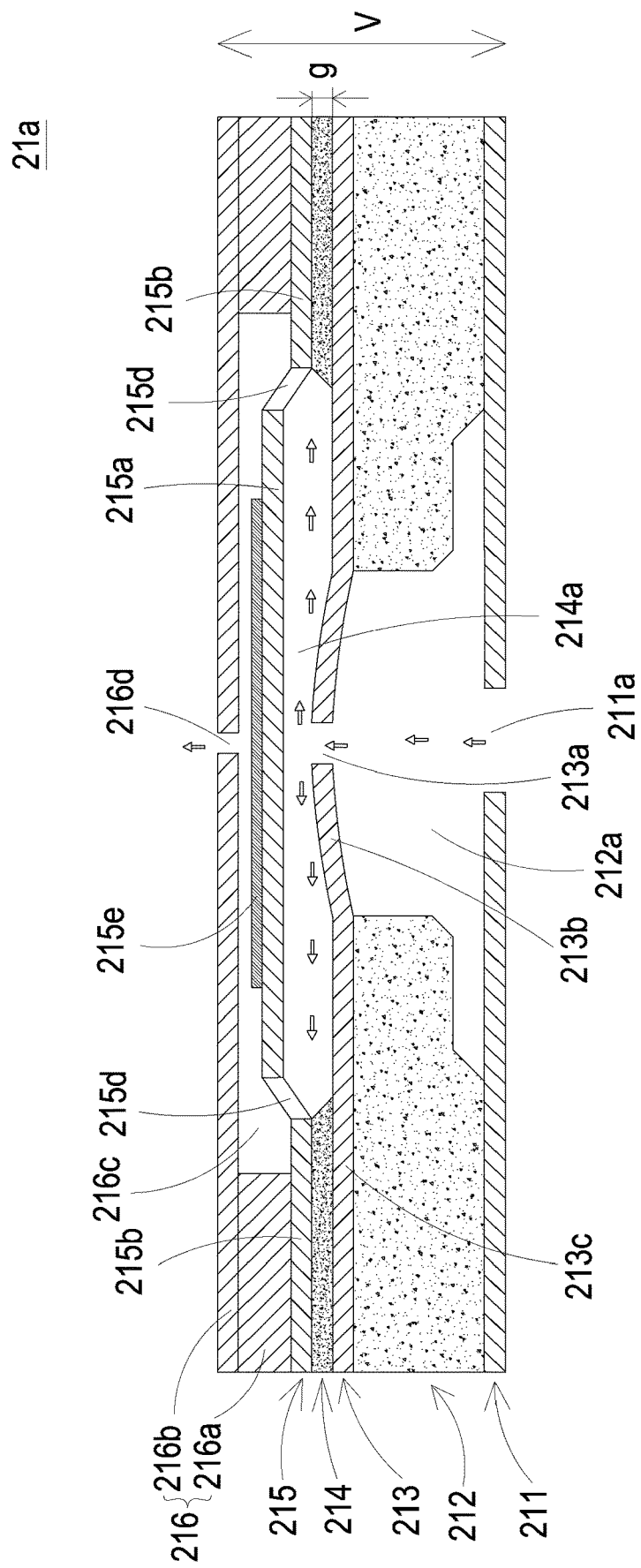
FIGS. 3C and 3D schematically illustrate the actions of the flow guiding unit of the fluid actuation system of the present disclosure.
Figure 3D:
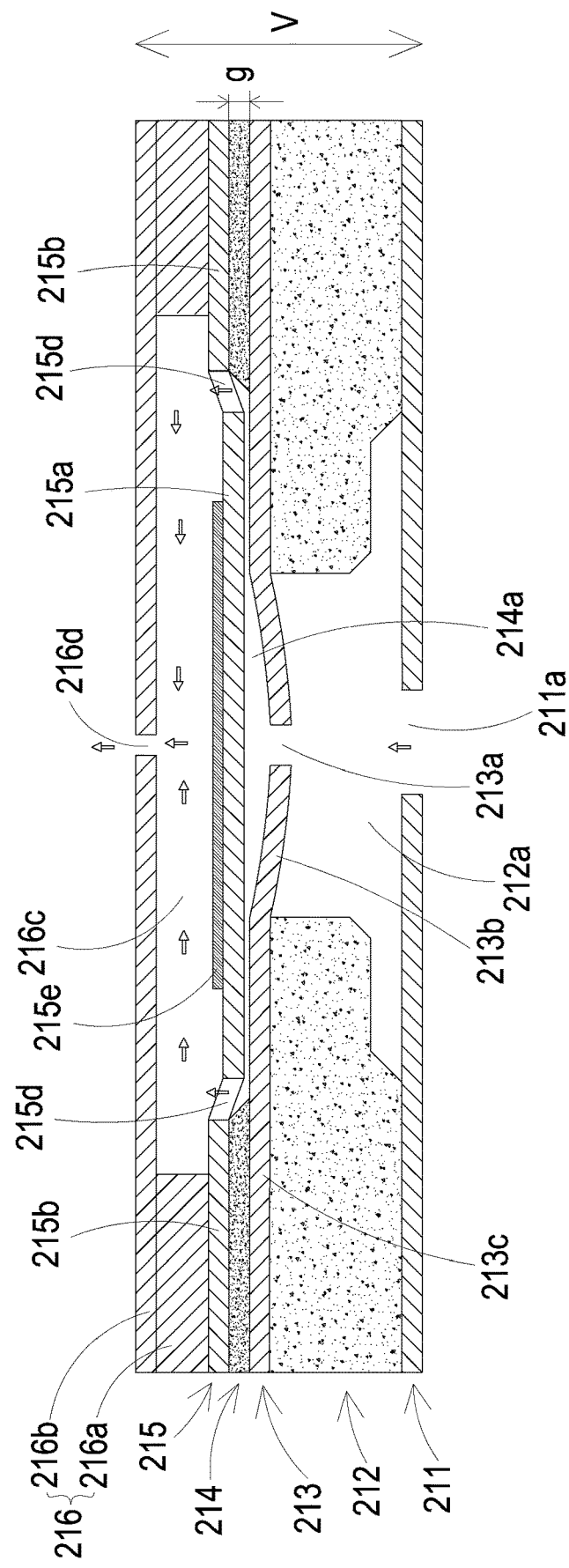

Please refer to FIGS. 3C and 3D. In this embodiment, the action of the flow guiding unit 21a is described as follow. When the piezoelectric element 215e is driven in response to an applied voltage, the piezoelectric element 215e undergoes bending deformation to drive the actuator 215 to vibrate along a vibrating direction V in a reciprocating manner. Please refer to FIG. 3C. When the piezoelectric element 215e undergoes the bending deformation in response to the applied voltage, the suspension part 215a of the actuator 215 is driven to move in the direction away from the base 212. The movable part 213b of the resonance plate 213 is driven along with the suspension part 215a and also moves in the direction away from the base 212. In that, the volume of the buffering chamber 214a of the spacer 214 is enlarged, and the pressure in the buffering chamber 214a is reduced to generate a sucking force. The fluid is inhaled in the inlet plate 211 through the inlet aperture 211a, and is then guided into the communication channel 212a of the base 212. Then, the fluid flows into the buffering chamber 214a through the central aperture 213a of the resonance plate 213 for temporary storage. Please refer to FIG. 3D. When the piezoelectric element 215e undergoes the bending deformation and vibrates downwardly, the suspension part 215a of the actuator 215 is driven by the piezoelectric element 215e to move in a direction toward the base 212. The buffering chamber 214a is compressed by the suspension part 215a of the actuator 215 to reduce the volume thereof, and the fluid in the buffering chamber 214a is compressed toward the periphery and flows into the outlet chamber 216c through the plurality of vacant spaces 215d. Please refer to FIG. 3C, again. When the piezoelectric element 215e undergoes the bending deformation and vibrates upwardly to move in the direction away from the base 212, the suspension part 215a of the actuator 215 is driven to move in the direction away from the base 212. Consequently, the fluid temporarily stored in the outlet chamber 216c is discharged out of the flow guiding unit 21a through the outlet aperture 216d of the outlet plate 216 so as to accomplish a fluid transportation process. By performing the above actions and steps illustrated in FIGS. 3C and 3D repeatedly, a pressure gradient occurs between the outlet chamber 216c and the buffering chamber 214a, and the fluid is continuously inhaled into the inlet aperture 211a to be pressurized and discharged out through the outlet aperture 216d. In such way, the purpose of fluid transportation is achieved.

In the embodiment, it should be noted that the vibration frequency of the resonance plate 213 in the reciprocating manner may be identical to the vibration frequency of the actuator 215. That is, the resonance plate 213 and the actuator 215 synchronously vibrate along the same direction. It should be noted that numerous modifications and alterations of the actions of the flow guiding unit 21a may be made while retaining the teachings of the disclosure. In this embodiment, the flow guiding unit 21a can generate the pressure gradient in the designed fluid channels of itself to facilitate the fluid to flow at a high speed. Since there is an impedance difference between the inlet direction and the outlet direction, the fluid can be transported from the inlet aperture 211a to the outlet aperture 216d of the flow guiding unit 21a. Moreover, even if a gas pressure exists at the discharge end of the outlet aperture 216d, the flow guiding unit 21a still has the capability to discharge out the fluid while achieving the silent efficacy.

Figure 4A:
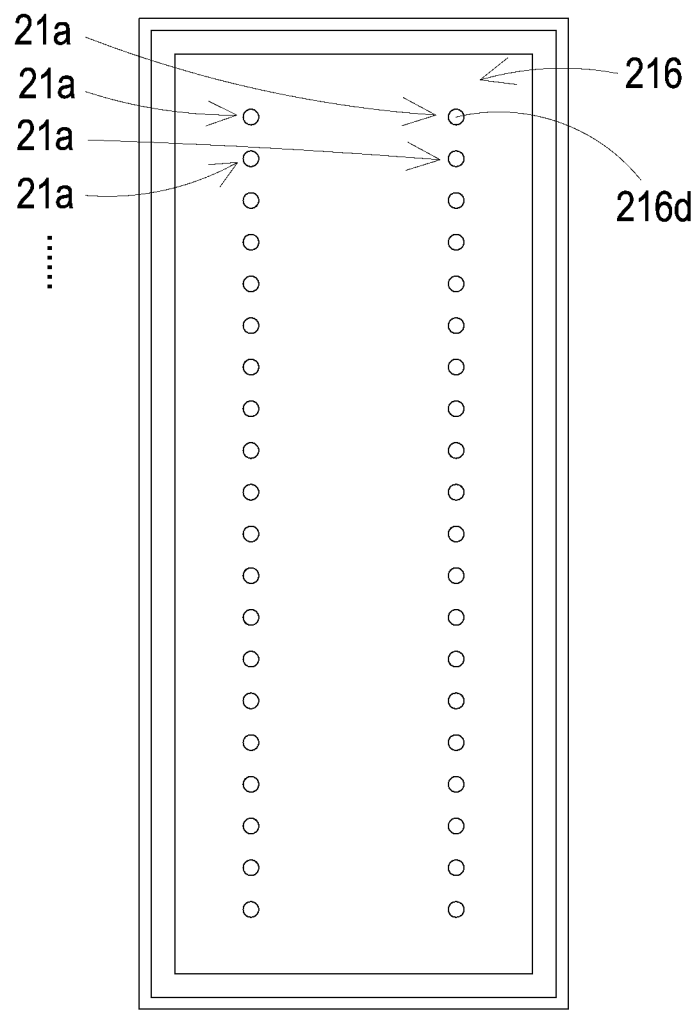
FIG. 4A schematically illustrates the arrangement of the driving module of the fluid actuation system according to an embodiment of the present disclosure.
Figure 4B:
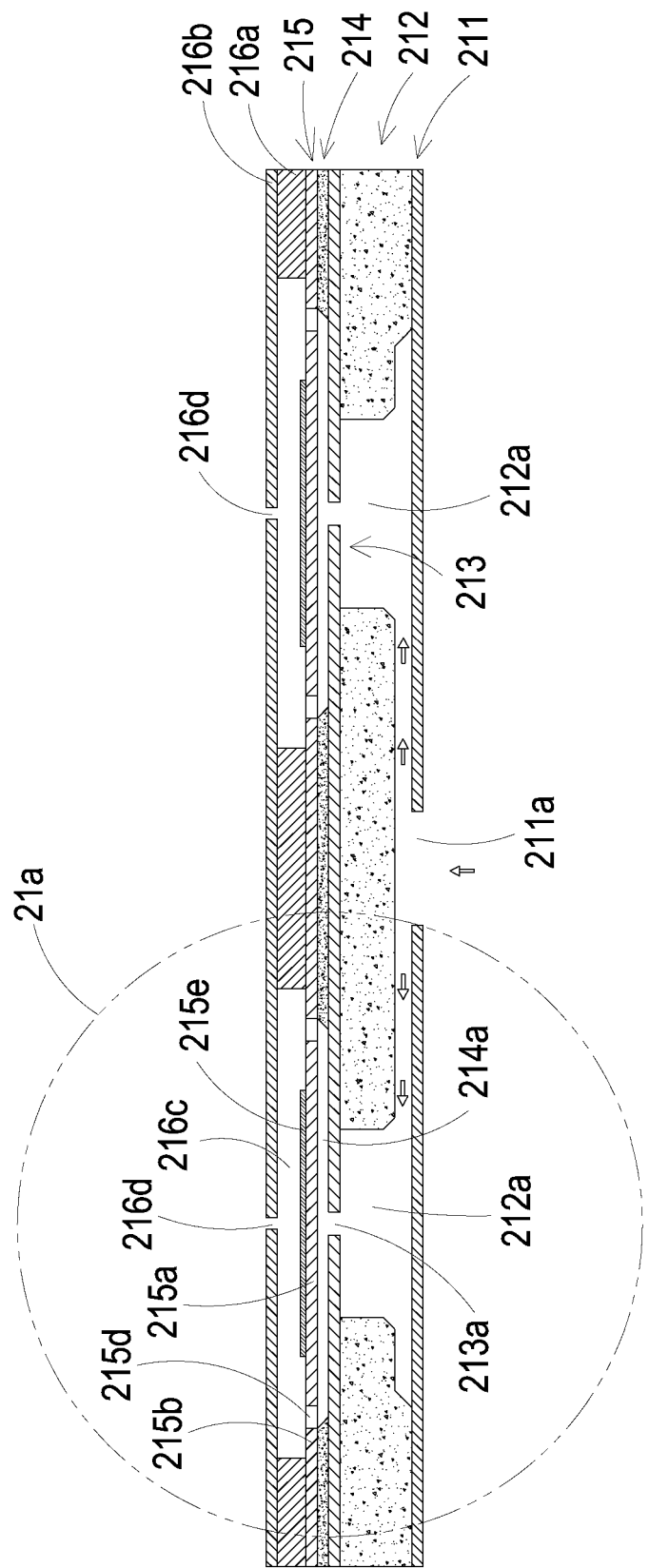
FIG. 4B schematically illustrates the fluid actuation system, in which the flow guiding units are connected with each other in a serial arrangement.
Figure 4C:
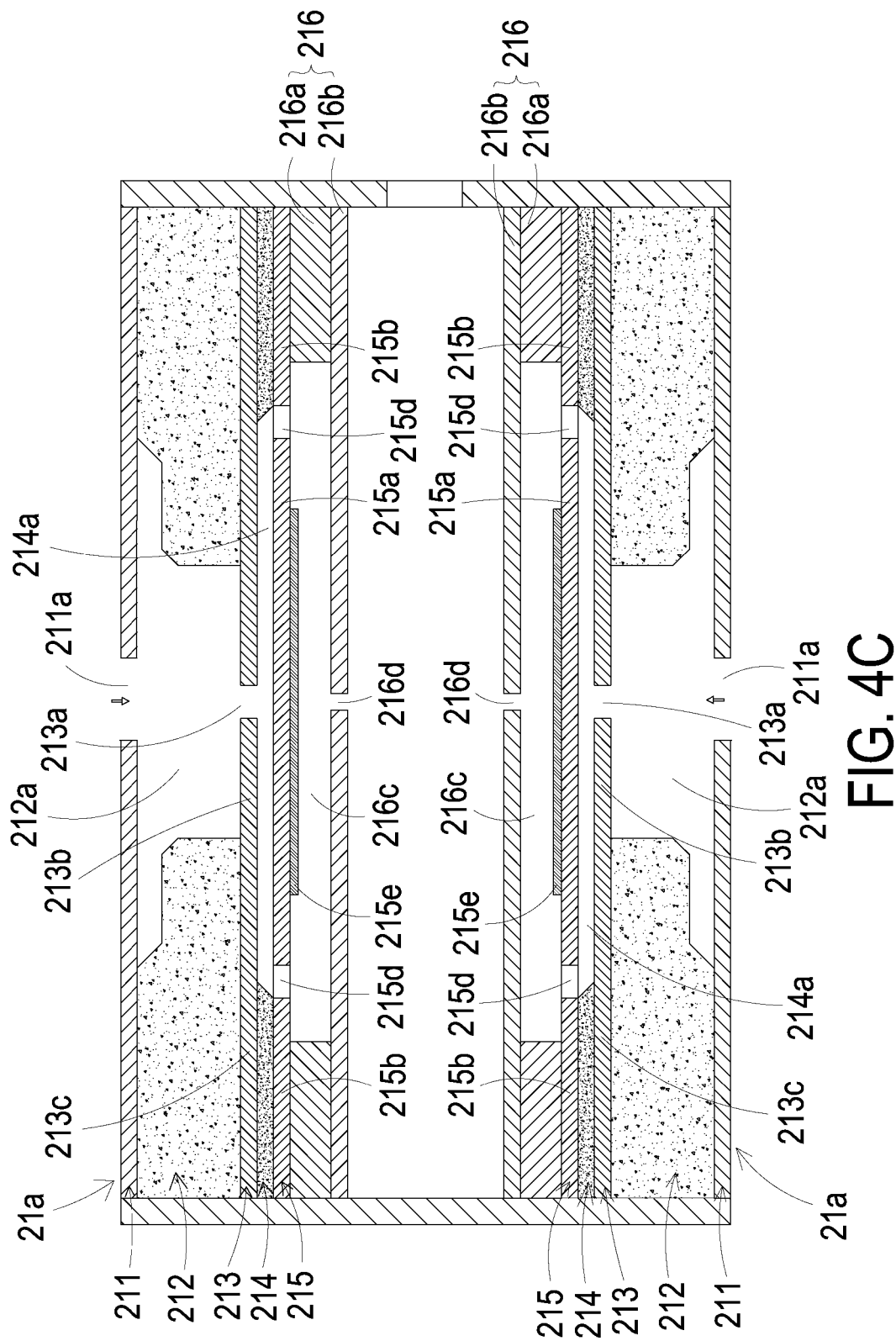
FIG. 4C schematically illustrates the fluid actuation system, in which the flow guiding units are connected with each other in a parallel arrangement.
Figure 4D:
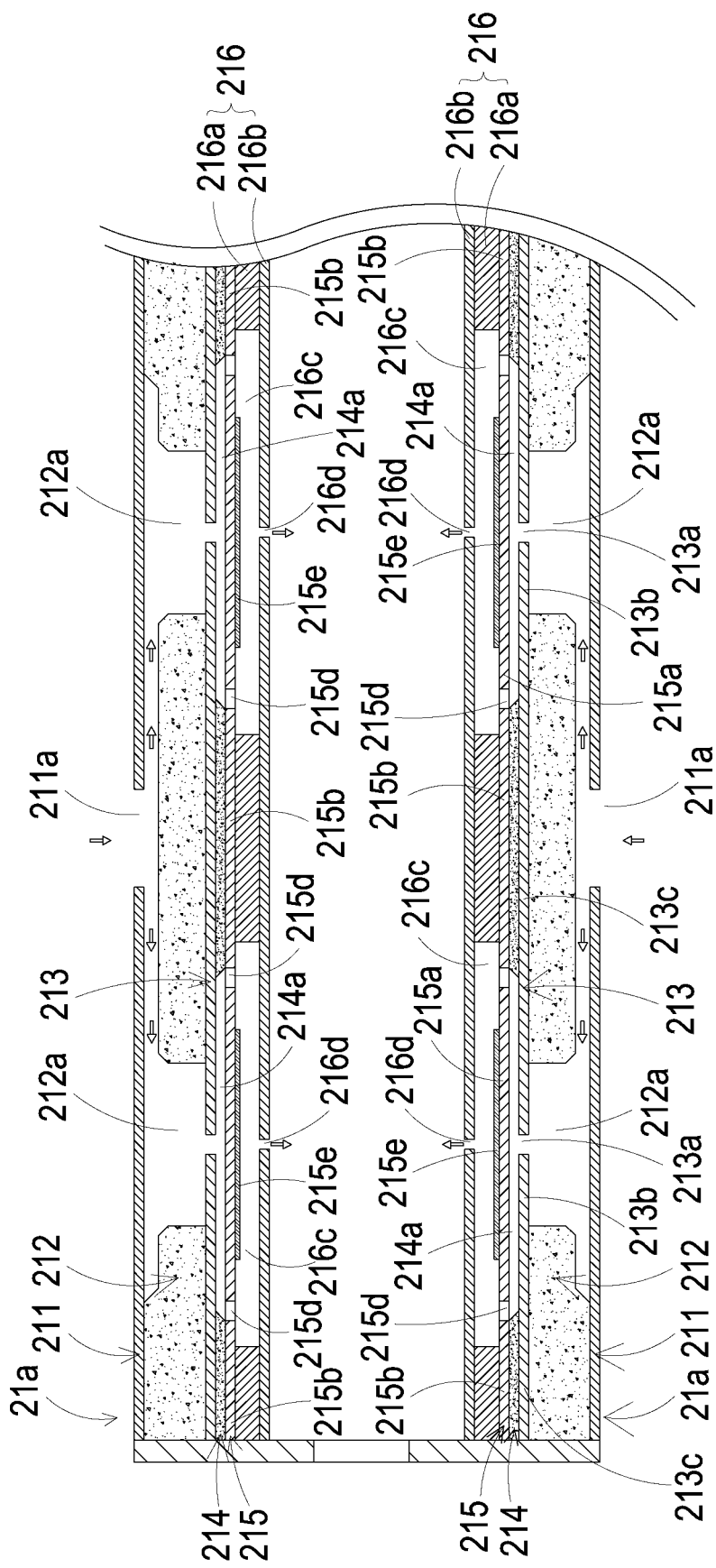
FIG. 4D schematically illustrates the fluid actuation system, in which the flow guiding units are connected with each other in a serial-and-parallel arrangement.
Figure 5:
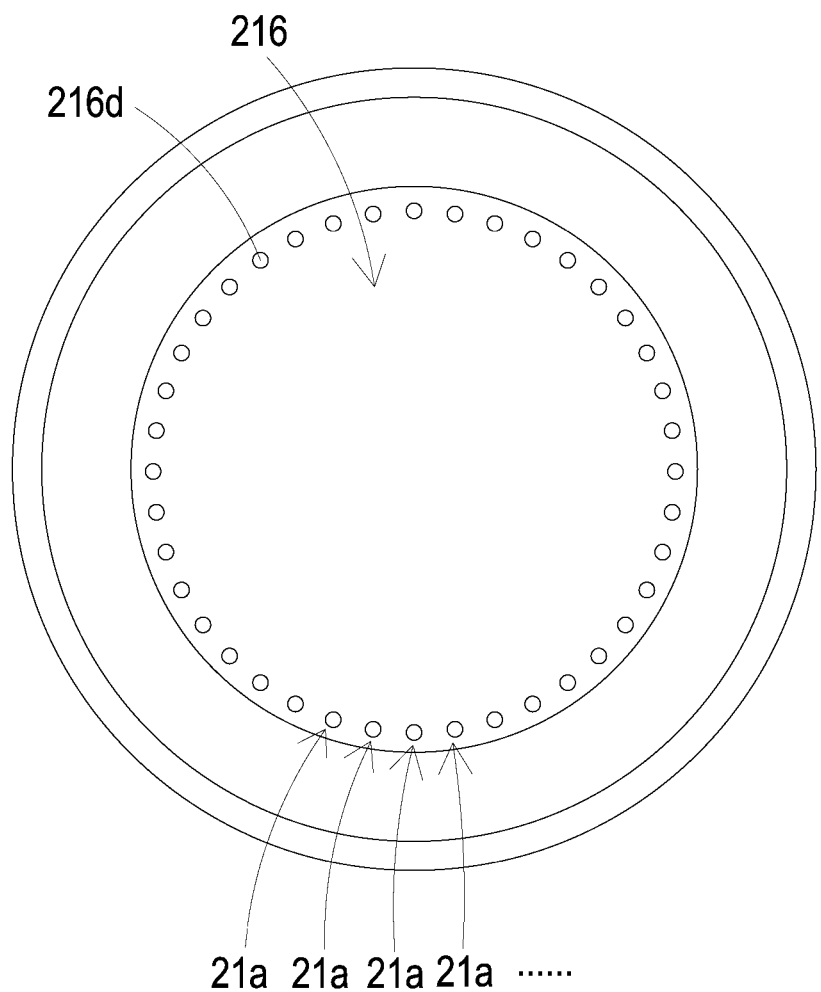
FIG. 5 schematically illustrates the arrangement of the driving module of the fluid actuation system according to another embodiment of the present disclosure.
Figure 6:
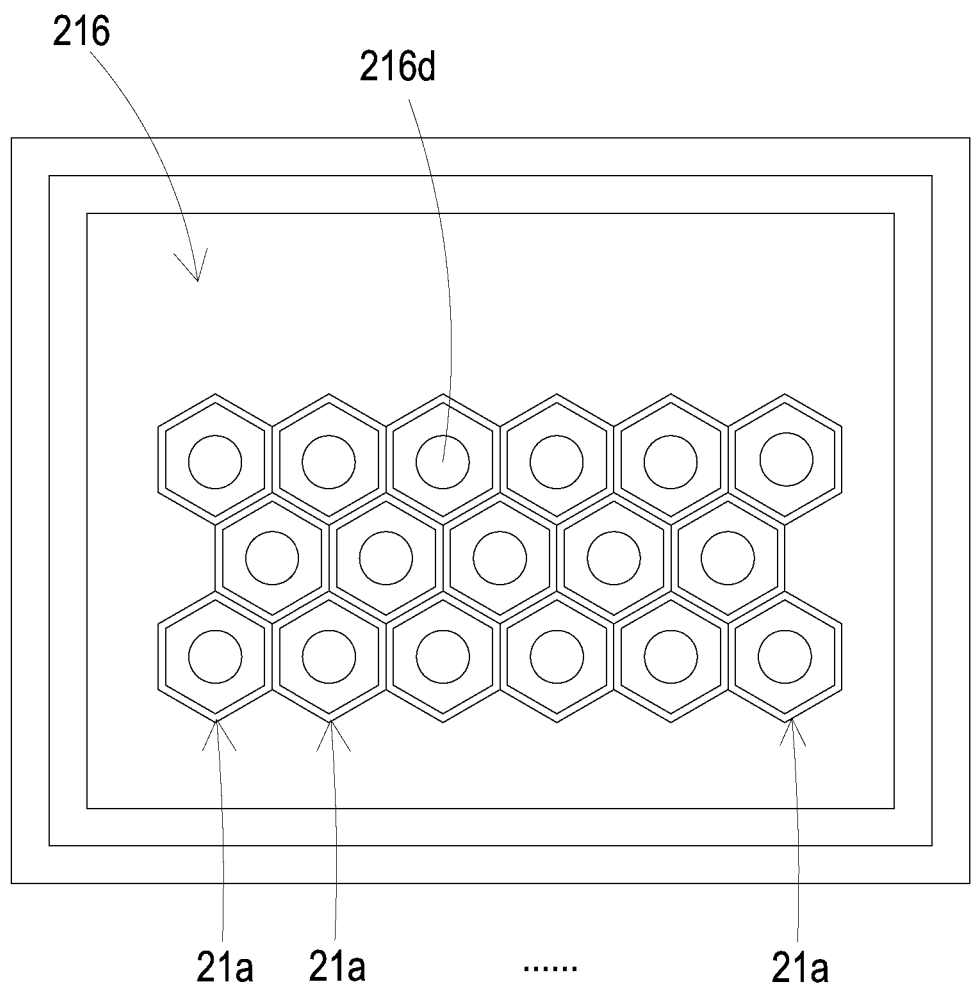
FIG. 6 schematically illustrates the arrangement of the driving module of the fluid actuation system according to a further embodiment of the present disclosure.

Please refer to FIGS. 4A to 4D, 5 and 6. In this embodiment, the amount and the speed of the fluid discharged from the driving module 21 is adjustable according to the arrangement of the flow guiding units 21a. As shown in FIGS. 4A and 4B, in the embodiment with first arrangement, the flow guiding units 21a are disposed in a serial arrangement, so as to increase the amount of the fluid discharged from the driving module 21. At least two flow guiding units 21a share the same the inlet aperture 211a. As shown in FIG. 4C, in the embodiment with second arrangement, the flow guiding units 21a are disposed in a parallel arrangement, so as to increase the speed of the fluid discharged from the outlet apertures 216d of the driving module 21. As shown in FIG. 4D, the flow guiding units 21a are disposed in a serial-and-parallel arrangement, so as to increase the amount of the fluid discharged from the driving module 21 and increase the speed of the fluid discharged from the outlet apertures 216d. According to the embodiment shown in FIG. 5, the flow guiding units 21a of the driving module 21 are disposed in a ring-shaped arrangement, so as to increase the amount of the fluid discharged from the driving module 21. According to the embodiment shown in FIG. 6, the flow guiding units 21a are disposed in a honeycomb arrangement, so as to increase the amount of the fluid discharged from the driving module 21.

In this embodiment, it should be noted that for transporting a great amount of fluid according to the practical requirements, the flow guiding units 21a of the fluid actuation system 2 have high flexibility in assembling arrangement as long as being connected with the driving circuit, and the flow guiding units 21a may be enabled to transport the fluid simultaneously. In addition, each flow guiding unit 21a may be individually controlled to be enabled or disabled. For example, one flow guiding unit 21a is enabled, and the other flow guiding unit 21a is disabled. Another example is that the flow guiding units 21a are alternately enabled, but not limited thereto. Consequently, the purpose of transporting the fluid and the purpose of reducing the power consumption is achieved.

Please refer to FIGS. 2, 3A and 4A. The flow guiding channel 22 is in fluid communication with the outlet apertures 216d of the flow guiding units 21a, so as to receive the fluid discharged from the flow guiding units 21a. Moreover, the flow guiding channel 22 include a plurality of diverge channels, each of the diverge channels is further in fluid communication with a plurality of connection channels, and the fluid is converged to the fluid discharging zone 25 through the plurality of connection channels. In that, the fluid is outputted with the required amount. In this embodiment, the diverge channels are exemplified by a first diverge channel 22a and a second diverge channel 22b, and are not limited thereto. The connection channels are exemplified by a first connection channel set 22c and a second connection channel set 22d, and are not limited thereto. Moreover, the first connection channel set 22c includes a first connection channel 221c and a third connection channel 222c, and the second connection channel set 22d includes a second connection channel 221d and a fourth connection channel 222d. In the embodiment, it should be noted that the lengths and the widths of the diverge channels are preset according to the required amount of the fluid to be transported. Namely, the lengths and the widths of the first diverge channel 22a and the second diverge channel 22b affect the flow rate and the amount of the fluid to be transported. According to the required amount of the fluid to be transported, the lengths and the widths of the first diverge channel 22a and the second diverge channel 22b may be determined and preset on the basis of calculation.

In this embodiment, it should be noted that although the first diverge channel 22a and the second diverge channel 22b are disposed in a parallel arrangement, but not limited thereto. In some embodiments, the first diverge channel 22a and the second diverge channel 22b can also be disposed in a serial arrangement, or can be disposed in a serial-and-parallel arrangement.

In this embodiment, it should be noted that the first connection channel 221c and the third connection channel 222c is in fluid communication with the first diverge channel 22a in a parallel arrangement, but not limited thereto. In some embodiments, the first connection channel 221c and the third connection channel 222c is in fluid communication with the first diverge channel 22a in a serial arrangement, or is in fluid communication with the first diverge channel 22a in a serial-and-parallel arrangement. Likely, the second connection channel 221d and the fourth connection channel 222d is in fluid communication with the second diverge channel 22b in a parallel arrangement, but not limited thereto. In some embodiments, the second connection channel 221d and the fourth connection channel 222d is in fluid communication with the second diverge channel 22b in a serial arrangement, or is in fluid communication with the second diverge channel 22b in a serial-and-parallel arrangement.

Please refer to FIG. 2. In this embodiment, the convergence chamber 23 is disposed and in fluid communication between the first diverge channel 22a and the second diverge channel 22b to allow the fluid to be accumulated therein. Under the circumstances that the total amount of fluid to be required, for example, exceeds the preset value, the convergence chamber 23 may supply sufficient fluid to be transported by the flow guiding channel 22 and compensate the deficit. In other words, the convergence chamber 23 may function as a backup chamber configured to subtly control the amount of fluid to be transported during operation.

Please refer to FIG. 2. In this embodiment, the valves 24a, 24b, 24c, 24d are disposed between the corresponding connection channels and the fluid discharging zone 25, and are controlled in an open/closed state by the controller 3, so that the fluid is controlled to be outputted to the fluid discharging zone 25. The valves 24a, 24b, 24c, 24d may be active valves or passive valves. In the embodiment, the plurality of valves 24a, 24b, 24c, 24d are the active valves and are disposed in the first connection channel 221c, the second connection channel 221d, the third connection channel 222c and the fourth connection channel 222d, respectively and sequentially. When the valve 24a is controlled in the open state, the first connection channel 221c allows the fluid to flow to the fluid discharging zone 25. When the valve 24b is controlled in the open state, the second connection channel 221d allows the fluid to flow to the fluid discharging zone 25. When the valve 24c is controlled in the open state, the second connection channel 222c allows the fluid to flow to the fluid discharging zone 25. When the valve 24d is controlled in the open state, the fourth connection channel 222d allows the fluid to flow to the fluid discharging zone 25.

Figure 7A:
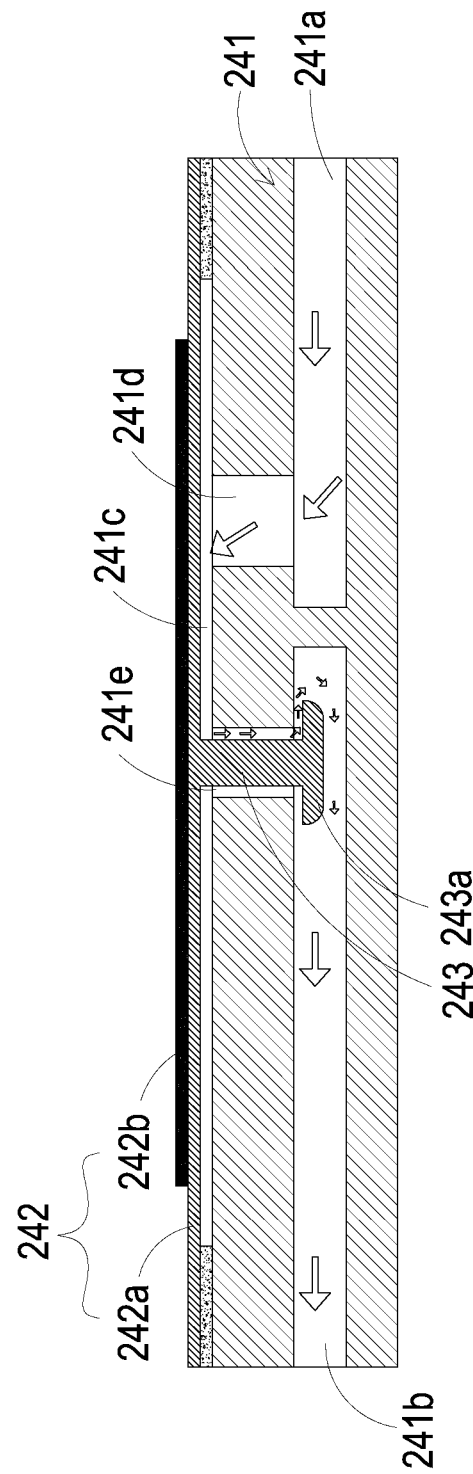
FIGS. 7A and 7B are schematic cross-sectional views illustrating the actions of the valve used in the fluid actuation system according to a first aspect of the embodiment of the present disclosure.
Figure 7B:
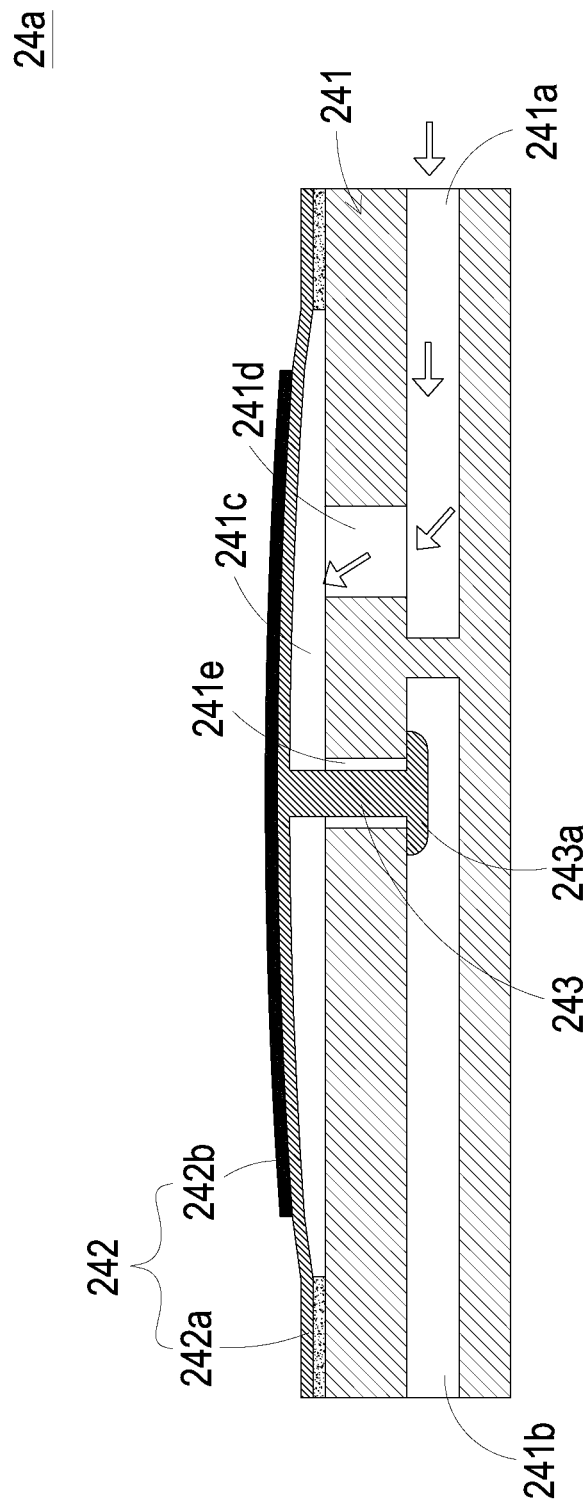

Please refer to FIGS. 7A and 7B. The valve 24a is exemplified as being disposed in the first connection channel 221c (Referring to FIG. 2). The structures and actions of the valves 24b, 24c, 24d disposed in the second connection channel 221d, the third connection channel 222c and the fourth connection channel 222d are similar to the structure and the actions of the valve 24a disposed in the first connection channel 221c, and are not redundantly described herein. In this embodiment, the valve 24a includes a channel base 241, a piezoelectric actuator 242 and a linking bar 243. The channel base 241 includes a first opening 241a, a second opening 241b, a first outlet 241d and a second outlet 241e. The first opening 241a and the second opening 241b are in fluid communication with the first connection channel 221c and are separated from each other by a partial structure of the channel base 241. A cavity 241c is concavely formed on the channel base 241. The cavity 241c is in fluid communication with the first opening 241a through the first outlet 241d, and is in fluid communication with the second opening 241b through the second outlet 241e. The first outlet 241d is in fluid communication with the first opening 241a, and the second outlet 241e is in fluid communication with the second opening 241b. The piezoelectric actuator 242 includes a carrier plate 242a and a piezoelectric material 242b. The carrier plate 242a may be made of a flexible material. The carrier plate 242a is located over the cavity 241c to cover the cavity 241c, so that the cavity 241c is closed. The piezoelectric material 242b is attached on a first surface of the carrier plate 242a and electrically connected to the controller 3 (Referring to FIG. 2). A first end of the linking bar 243 is connected with a second surface of the carrier plate 242a, and the linking bar 243 is inserted into the second outlet 241e and is movable within the second outlet 241e along a vertical direction. That is, the linking bar 243 may move along the direction perpendicular to the second opening 241b and the carrier plate 242a. A second end of the linking bar 243 is formed as a stopping part 243a to be used to close the second outlet 241e. The cross-section area of the stopping part 243a has a diameter greater than the diameter of the second outlet 241e, by which the stopping part 243a is used to seal the second outlet 241e. In this embodiment, the stopping part 243a may be a flat plate structure or a mushroom-shaped structure, but not limited thereto.

Please refer to FIG. 7A. In this embodiment, when the piezoelectric actuator 242 of the valve 24a is not enabled, the linking bar 243 is in an initial position. Meanwhile, a communication space is formed between the stopping part 243a and the second outlet 241e for allowing the second opening 241b, the cavity 241c and the first opening 241a to be in fluid communication with each other and in fluid communication with the first connection channel 221c (Referring to FIG. 2), so that the fluid is allowed to flow therethrough. On the contrary, referring to FIG. 7B, when the piezoelectric actuator 242 is enabled, the carrier plate 242a is driven to undergo bending deformation in the direction away from the channel base 241 by the piezoelectric material 242b, so that the linking bar 243 is also driven to move in the direction away from the channel base 241 by the carrier plate 242a. Consequently, the second outlet 241e is closed by being covered by the stopping part 243a, and the fluid cannot be transported through the second outlet 241e. In such way, the valve 24a makes the first connection channel 221c in the open state when the valve 24a is non-enabled, and the valve 24a makes the first connection channel 221c in the closed state when the valve 24a is enabled. In other words, the fluid is selectively transported through the first connection channel 221c, which is controlled by a fluid communication state of the second opening 241b of the valve 24a.

Figure 8A:
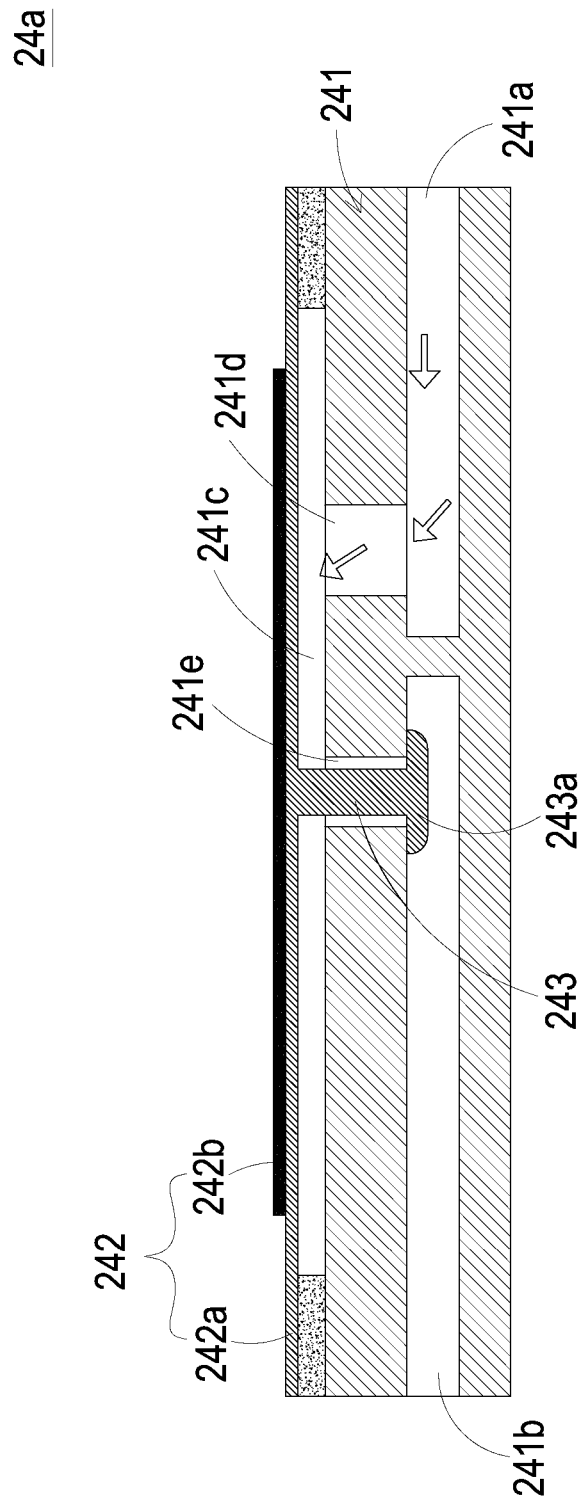
FIGS. 8A and 8B are schematic cross-sectional views illustrating the actions of the valve used in the fluid actuation system according to a second aspect of the embodiment of the present disclosure.
Figure 8B:
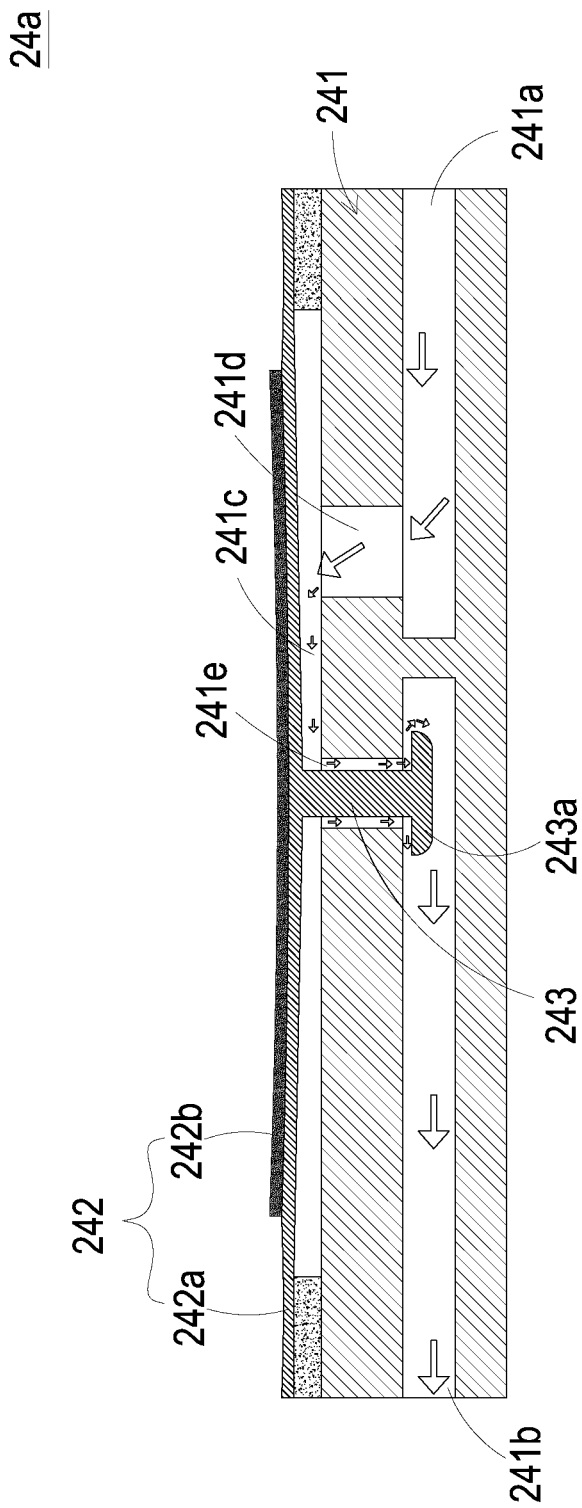

Please refer to FIGS. 8A and 8B. Another embodiment of the valve 24a is shown in FIG. 8A. When the piezoelectric actuator 242 of the valve 24a is not enabled, the linking bar 243 is in an initial position. Meanwhile, the second outlet 241e is closed by being sealed by the stopping part 243a, and the fluid cannot be transported through the second outlet 241e. Please refer to FIG. 8B. When the piezoelectric actuator 242 is enabled, the carrier plate 242a is driven to undergo bending deformation in the direction close to the channel base 241 by the piezoelectric material 242b, so that the linking bar 243 is also driven to move in the direction close to the channel base 241 by the carrier plate 242a. Under this circumstance, a communication space is formed between the stopping part 243a and the second outlet 241e for allowing the second opening 241b, the cavity 241c and the first opening 241a to be in fluid communication with each other and in fluid communication with the first connection channel 221c (Referring to FIG. 2), so that the fluid is allowed to flow therethrough. In such way, the valve 24a makes the first connection channel 221c in the closed state when the valve 24a is non-enabled, and the valve 24a makes the first connection channel 221c in the open state when the valve 24a is enabled. In other words, the fluid is selectively transported through the first connection channel 221c, which is controlled by a fluid communication state of the second opening 241b of the valve 24a.

Please refer to FIG. 2. In this embodiment, the controller 3 is used to control the open/closed state of the valves 24a, 24b, 24c, 24d so as to provide the flying main body 1 with a driving power for aerial mobility, control the flight condition of the flying main body 1 and control the operation of the image capture system 4. In this embodiment, the controller 3 includes a power supply unit 31 and a processor unit 32. The power supply unit 31 is used to output the electrical power to the flow guiding units 21a of the fluid actuation system 2 and the image capture system 4 for driving them. In this embodiment, the power supply unit 31 is an energy absorption board for converting light energy into electricity and outputting electricity. In some embodiments, the power supply unit 31 is a graphene battery or a rechargeable battery, but not limited thereto. The type of the power supply unit 31 can be varied according to design requirements. The processor unit 32 is used to perform a data calculation process and a transmission process. The data calculation process includes calculating the open/closed state of the valves 24a, 24b, 24c, 24d, calculating the flight condition of the flying main body 1 and processing the image captured by the image capture system 4, but not limited thereto. The transmission process includes transmitting and receiving the remote signal of the flying main body 1 and transmitting the image captured by the image capture system 4, but not limited thereto.

Please refer to FIG. 2. In this embodiment, the image capture system 4 is used to capture the external image for the micro detecting device 10. In this embodiment, the image captured by the image capture system 4 is a photo, a video, or any special image used for scientific observation (e.g. infrared thermal image), but not limited thereto. In this embodiment, the image capture system 4 is a miniature camera, but not limited thereto. The type of the image capture system 4 can be varied according to the practical requirements.

Please refer to FIG. 2. In this embodiment, the conductive wire unit 5 is electrically connected between the controller 3 and the valves 24a, 24b, 24c, 24d. In this embodiment, the conductive wire unit 5 includes a first conductive wire 5a and a second conductive wire 5b. The first conductive wire 5a is electrically connected to the valves 24a, 24d. The second conductive wire 5b is electrically connected to the valves 24b, 24c. In that, the valves 24a, 24b, 24c, 24d can be driven by the controller 3 so as to control the fluid communication states of the first connection channel 221c, the second connection channel 221d, the third connection channel 222c and the fourth connection channel 222d and control the fluid to be outputted to the fluid discharging zone 25. It should be noted that each valve (i.e., valve 24a, valve 24b, valve 24c or valve 24d) may also be operated independently under control. In this way, the amount of fluid to be transported can be controlled in a subtly way and more accurately.

From the above descriptions, the present disclosure provides a micro detecting device. By the fluid actuation system, the needs of controlling various transporting amount is satisfied and the gas transportation in high transporting amount, high efficiency and high flexibility is achieved. Consequently, sufficient driving force is provided for aerial mobility, and the efficacy of miniaturization, portable, low noise and convenience are achieved. Moreover, the external environment detection of the micro detecting device is achieved by the image capture system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A micro detecting device, comprising:
    a flying main body;
    at least one fluid actuation system disposed within the flying main body and comprising:
        a driving module consisting of a plurality of flow guiding units, wherein each flow guiding unit is actuated to transport fluid;
        a flow guiding channel comprising a plurality of diverge channels, wherein each of the diverge channels is in fluid communication with a plurality of connection channels, whereby the fluid is split into fluid streams to be converged for a required amount of the fluid;
        a convergence chamber in fluid communication between the two corresponding diverge channels to allow the fluid to be accumulated therein;
        a plurality of valves, each of the valves disposed in the corresponding connection channel and controlled in an open/closed state for the corresponding connection channel; and
        a fluid discharging zone in communication with the plurality of connection channels to converge and output the fluid with the required amount;
    an image capture system used to capture an external image of the micro detecting device; and
    a controller connected to the plurality of valves to control the plurality of valves in the open/closed state so as to provide the flying main body with a driving force for aerial mobility, control flight condition of the flying main body and control operation of the image capture system.

2. The micro detecting device according to claim 1, wherein the flow guiding unit comprises:
    an inlet plate comprising at least one inlet aperture;
    a base stacked on the inlet plate, and comprising a communication channel in fluid communication with the inlet aperture;
    a resonance plate stacked on the base, and comprising a central aperture, a movable part and a fixing part, wherein the central aperture is formed in a center part of the resonance plate and spatially corresponds to the communication channel of the base, wherein the movable part is a flexible structure formed around the central aperture and located at a part of the base not contacted therewith, wherein the fixing part is fixed on a part of the base contacted therewith;
    a spacer stacked on the fixing part of the resonance plate and having a center hollowed to form a buffering chamber;
    an actuator stacked on the spacer, and comprising a suspension part, an outer frame part, a plurality of connecting parts, a plurality of vacant spaces and a piezoelectric element, wherein the suspension part is connected with the outer frame part through the plurality of connecting parts, so that the suspension part is suspended and elastically supported by the plurality of connecting parts, wherein the plurality of vacant spaces are defined between the suspension part and the outer frame part for allowing the fluid to flow therethrough, wherein the piezoelectric element is attached on a surface of the suspension part; and an outlet plate consisting of a chamber plate and a cover plate attached to the chamber plate, wherein the chamber plate stacked on the actuator and forms an outlet chamber in center thereof, wherein the cover plate covers the outlet chamber and the actuator and has an outlet aperture in fluid communication with the outlet chamber;

wherein when the piezoelectric element of the actuator is driven and the suspension part vibrates between the outlet chamber and buffering chamber in a reciprocating manner, a pressure gradient occurs between the outlet chamber and the buffering chamber, and the fluid is inhaled through the inlet aperture of the inlet plate into the plurality of connection channels, flows through the central aperture of the resonance plate to the buffering chamber to be compressed, is transported into the outlet chamber through the plurality of vacant spaces of the actuator, and is discharged out through the outlet aperture of the outlet plate.

3. The micro detecting device according to claim 2, wherein the depth of the buffering chamber is defined by the thickness of the spacer.

4. The micro detecting device according to claim 1, wherein the lengths or the widths of the diverge channels are preset according to the required amount of the fluid to be transported.

5. The micro detecting device according to claim 1, wherein each of the valves comprises:

a channel base comprising a first opening, a second opening, a first outlet and a second outlet, wherein the first opening and the second opening are separated from each other and in fluid communication with corresponding one of the connection channels, and wherein a cavity is concavely formed in the channel base, is in fluid communication with the first opening through the first outlet, and is in fluid communication with the second opening through the second outlet;

a piezoelectric actuator comprising a carrier plate and a piezoelectric material, wherein the carrier plate covers the cavity, and the piezoelectric material is attached on a first surface of the carrier plate and electrically connected to the controller; and a linking bar comprising a first end and a second end, wherein the first end of the linking bar is connected with a second surface of the carrier plate, and the linking bar is inserted into the second outlet and is movable within the second outlet along a vertical direction perpendicular to the carrier plate, wherein the second end of the linking bar is formed as a stopping part configured to close the second outlet, and the cross-section area of the stopping part has a diameter greater than the diameter of the second outlet;

wherein when the piezoelectric actuator is enabled to drive the carrier plate to displace, the stopping part of the linking bar is driven to move for controlling an open/closed state of the second outlet.

6. The micro detecting device according to claim 1, wherein the plurality of flow guiding units of the driving module are disposed in a serial arrangement.

7. The micro detecting device according to claim 1, wherein the plurality of flow guiding units of the driving module are disposed in a parallel arrangement.

8. The micro detecting device according to claim 1, wherein the plurality of flow guiding units of the driving module are disposed in a serial-and-parallel arrangement.

9. The micro detecting device according to claim 1, wherein the plurality of flow guiding units of the driving module are disposed in a ring-shaped arrangement or a honeycomb arrangement.

10. The micro detecting device according to claim 1, wherein the plurality of flow guiding units are manufactured through a machining process.

11. The micro detecting device according to claim 1, wherein the plurality of flow guiding units are manufactured through a Microelectromechanical Systems (MEMS) process.

12. The micro detecting device according to claim 1, wherein the plurality of flow guiding units are manufactured through a semiconductor process.

13. The micro detecting device according to claim 1, wherein the plurality of flow guiding units are made of a material with millimeter structure, and the sizes of the flow guiding units are in the range between 1 millimeter and 999 millimeter.

14. The micro detecting device according to claim 1, wherein the plurality of flow guiding units are made of a material with micron structure, and the sizes of the flow guiding units are in the range between 1 micron and 999 micron.

15. The micro detecting device according to claim 1, wherein the plurality of flow guiding units are made of a material with nanometer structure, and the sizes of the flow guiding units are in the range between 1 nanometer and 999 nanometer.

16. The micro detecting device according to claim 1, wherein the image capture system is a miniature camera.

17. The micro detecting device according to claim 1, wherein the controller comprises a power supply unit, and the power supply unit is used to output the electrical power to the plurality of flow guiding units and the image capture system.

18. The micro detecting device according to claim 17, wherein the power supply unit is an energy absorption board for converting light energy into electricity and outputting electricity.

19. The micro detecting device according to claim 17, wherein the power supply unit is a graphene battery.

20. The micro detecting device according to claim 17, wherein the power supply unit is a rechargeable battery.

* * * * *